United States Patent [19]
Niederberger et al.

[11] Patent Number: 5,888,561
[45] Date of Patent: Mar. 30, 1999

[54] SEASONING PRODUCTION

[75] Inventors: Peter Niederberger, Epalinges, Switzerland; Johannes Baensch, Le Breuil-En-Auge, France; Hazel Geok Neo Khoo, Lausanne, Switzerland; Howe Ling Lai; Bee Gim Lim, both of Singapore, Singapore

[73] Assignee: Nestec S.A., Vevey, Switzerland

[21] Appl. No.: 921,264

[22] Filed: Aug. 29, 1997

[30] Foreign Application Priority Data

Sep. 17, 1996 [EP] European Pat. Off. ............ 96114850

[51] Int. Cl.$^6$ ................................. A61D 2/00; A23L 1/28
[52] U.S. Cl. ................. 426/20; 426/46; 426/52; 426/60; 426/589; 426/638; 426/650
[58] Field of Search ................. 426/20, 46, 52, 426/60, 589, 650, 638, 640

[56] References Cited

U.S. PATENT DOCUMENTS

| | | | |
|---|---|---|---|
| 3,932,671 | 1/1976 | Yokotsuka et al. | 426/7 |
| 4,117,169 | 9/1978 | Noda et al. | 426/7 |
| 4,308,284 | 12/1981 | Noda et al. | 426/7 |
| 4,329,370 | 5/1982 | Noda et al. | 426/46 |
| 4,587,127 | 5/1986 | Akao et al. | 426/46 |
| 4,684,527 | 8/1987 | Motai et al. | 426/46 |
| 4,855,148 | 8/1989 | Kuribayashi et al. | 426/46 |
| 5,141,757 | 8/1992 | Ho Dac et al. | 426/46 |
| 5,407,690 | 4/1995 | Müller et al. | 426/18 |
| 5,523,100 | 6/1996 | Teh | 426/46 |
| 5,626,894 | 5/1997 | Bengtsson et al. | 426/62 |

FOREIGN PATENT DOCUMENTS

| | | |
|---|---|---|
| 417481-A1 | 3/1991 | European Pat. Off. . |
| 640294-A1 | 3/1995 | European Pat. Off. . |
| 54-126794 | 10/1979 | Japan . |

*Primary Examiner*—Nina Bhat
*Attorney, Agent, or Firm*—Pennie & Edmonds LLP

[57] ABSTRACT

A process of treating a fermented protein koji prepared from a protein containing material and a carbohydrate, for the production of a seasoning, by hydrolyzing a mixture of the fermented protein koji together with a yeast at a temperature of from about 20° to 25° C. and a pH of from about 4.5 to 10 for a period of from about 6 hours to 28 days. The production time is reduced by at least one week compared to conventional methods.

20 Claims, No Drawings

SEASONING PRODUCTION

TECHNICAL FIELD

The present invention relates to a process for the production of a seasoning, more particularly to the production of seasoning by the biological hydrolysis of protein containing material.

BACKGROUND ART

Hydrolysed proteins have been known for use as seasonings in food systems for centuries in the Far East in the form of soya sauce which traditionally has been prepared by enzymatic hydrolysis requiring a long period of time, usually several months, for preparation. In producing soya sauce, plant protein containing materials such as cooked soya beans or defatted soya flour together with carbohydrates are inoculated with Aspergilli and the solid culture is fermented for 2 days to make fermented koji during which time enzymes are produced which are able to hydrolyse protein and carbohydrates in the moromi stage. The fermented koji is mixed with a solution of common salt to give moromi which is fermented for 4 to 8 months by the activity of micro-organisms such as soya lactic acid bacteria and soya yeasts from which the soya sauce is obtained by removing the solids portion from the fermented moromi.

About 100 years ago, a more rapid method of hydrolysing proteins for producing seasonings was developed using hydrochloric acid in which the time required is only a few hours. However, in recent years, the use of acid hydrolysed plant protein (HPP) in culinary applications has been under criticism due to the presence of some chloro-compounds which arises from the acid process. Therefore, attempts have been made to develop HPP replacements which can be used as body-givers in culinary applications. Soya sauce is one such suitable replacement. However, owing to the differences in the raw materials and the processing methods involved, the two products, HPP and soya sauce, have some differences in terms of chemical composition and flavor profile. Dosage of soya sauce which can be used as an HPP replacement is limited due to its "fermented" note. The different processing procedures also result in a significant variation in the degree of hydrolysis of the protein containing material to the amino acids. Soya sauce has a lower amino acid content than HPP and this leads to a significantly weaker body in soya sauce than in HPP.

In European patent application EP-640,291-A1, a process is disclosed for the production of a seasoning based on modified standard soya sauce technology in which the fermented koji is treated, before forming the moromi, by a low temperature hydrolysis whereby the resultant seasoning has a stronger body than a standard soya sauce. In this process, a fermented protein koji, prepared from a protein containing material and a carbohydrate, is treated by hydrolyzing the fermented protein koji at a temperature of from 2° to 25° C. and a pH of from 4.5 to 10 for a period of from 6 hours to 28 days. In order to improve the organoleptic and color stability of the seasoning product, salt and yeast are conveniently added to the hydrolyzed fermented koji to form a moromi and the moromi is preferably fermented under aerobic or anaerobic conditions for a period of from 1 to 6 weeks, more preferably from 2 to 4 weeks.

We have now found, surprisingly, that if yeast is incorporated during the hydrolysis of the fermented protein koji, cohydrolysis occurs causing a decrease in the reducing sugar level so that the subsequent moromi stage is unnecessary. This has the advantage of shortening the whole production time by at least one week. In addition, the amount of salt in the seasoning product may be varied as desired, e.g., from 0 to 100% by weight based on the weight of the fermented protein koji.

SUMMARY OF THE INVENTION

Accordingly, the present invention provides a process of treating a fermented protein koji prepared from a protein containing material and a carbohydrate, for the production of seasoning, which comprises hydrolyzing a mixture of the fermented protein koji together with yeast at a temperature of from about 2° to 25° C. and a pH of from about 4.5 to 10 for a period of from about 6 hours to 28 days.

The fermented koji is prepared by the conventional soya sauce process which comprises, for example, inoculating a rotein containing material and a carbohydrate with a culture of *Aspergillus oryzae* and/or *Aspergillus sojae* on a culture bed to form the fermented koji. The protein containing material is advantageously a plant protein material, for instance, soya beans, corn gluten or rice gluten but is preferably wheat gluten. The plant protein containing material is advantageously cooked and is preferably used in solid particulate form for enabling the mould of *Aspergillus oryzae* and/or *Aspergillus sojae* to grow on the surface of the particles and eventually penetrate into the particles. The koji is conveniently fermented in the solid state.

DETAILED DESCRIPTION OF THE PREFERRED EMBODIMENTS

The hydrolysis of the mixture of fermented koji and yeast is carried out in the absence of salt and advantageously with constant agitation, conveniently using from about 1 to 5 parts by weight of water per part by weight of fermented koji and preferably at a pH of from 6 to 7.5 which may be obtained by adding a base such as sodium hydroxide. The hydrolysis is carried out preferably at a temperature from 2° to 20° C. for a period of from 12 hours to 25 days, more preferably from 3° to 15° C. for a period of from 18 hours to 22 days and especially from 4° to 10° for a period of from 24 hours to 20 days. The amount of yeast present during hydrolysis may be from about 0.05 to 1%, preferably from 0.1 to 0.7% and especially from 0.2 to 0.5% by weight based on the weight of the hydrolysate. The yeast may be, for instance, instant dry yeast, e.g., *Saccharomyces cerevisiae* or *Debaromyces hansenii*.

Advantageously, the hydrolysis at 2° to 25° C. may be preceded by a preliminary hydrolysis step at a temperature above 25° C. e.g., up to 50° C. preferably from about 27° to 45° C. and more preferably from 30° to 35° C. The duration of the preliminary hydrolysis step is preferably from about 3–36 hours, more preferably from 5–30 hours and especially from 8–24 hours. The pH of the preliminary hydrolysis step is preferably from about 4.5 to 5.5, any pH adjustment advantageously being carried out by adding an acid such as an organic acid, e.g., acetic acid. The pH range may also be achieved by adding an inoculum of lactic acid bacteria.

Yeast may be present in the preliminary hydrolysis step, the presence of which more effectively utilizes and decreases the reducing sugar level. Salt is absent in the preliminary hydrolysis step. The amount of yeast present during the preliminary hydrolysis may be from about 0.05 to 1%, preferably from 0.1 to 0.7% and especially from 0.2 to 0.5% by weight based on the weight of the hydrolysate. The yeast may be, for instance, instant dry yeast, e.g., *Saccharomyces cerevisiae* or *Debaromyces hansenii*.

The amount of reducing sugar may be decreased to below 1%, preferably to below 0.75% and especially below 0.3%.

This decrease in the reducing sugar content enables the production of a more stable finished product having a longer shelf life and an improved retention of color and taste.

Advantageously, a glucose oxidase may be added to the mixture of the fermented protein koji and yeast for helping to decrease the reducing sugar content. The glucose oxidase may be added before, during or after hydrolysis of the mixture of the fermented protein koji and yeast.

After hydrolysis, salt may be added if desired, the amount of salt being up to 70% by weight of the final product based on dry matter.

After the hydrolysis, the mixture of fermented koji and yeast may be pressed to separate a liquid sauce from a solid residue. The liquid sauce is advantageously heat treated, e.g., at a temperature of from about 80° to 140° C. and then filtered to give a liquid seasoning. If desired, the liquid sauce may be made into a powder for instance, by concentration, then dried, e.g., vacuum dried or spray dried, to a low moisture content and finally milled into a powder to give a solid seasoning.

The process according to the present invention results in a higher level or degree of release of amino acids than is generally possible with conventional soya sauce processes. The seasoning either in liquid or powder form has a higher amino acid content than soya sauce prepared by conventional methods. Because of the higher amino acid content, the seasoning of the present invention has more body than soya sauce prepared by conventional methods. The seasoning prepared according to the present invention has excellent organoleptical stability. In addition, since the moromi stage is eliminated, the whole production time may be shortened by from 1 to 6 weeks.

EXAMPLES

The present invention will now be further illustrated by the following Examples in which parts and percentages are given by weight.

Example 1

Wheat gluten was extruded through a Clextral extruder into pieces having an average diameter of 5 mm and had a porous structure. 65 kg of the extrudates were soaked in 65 kg water at 75° C. for 5 minutes. The soaked extrudates were then heated to 100° C. and held at the same temperature for 10 minutes and afterwards cooled to below 40° C. by applying vacuum. The pasteurization step was carried out to eliminate secondary contamination after the extrusion step. Finally the cooked extrudates were mixed with a mixture of 28 kg of roasted wheat and 20 g of TKJ (Aspergillus oryzae seed inoculum) to give a wheat gluten koji which was fermented for 42 hours by a procedure similar to that used in a conventional soya sauce process. The wheat gluten koji contained no added salt.

During the 42 hours of koji fermentation, the following temperature profiles were maintained for the culture bed:
0–25 hours 30° C. 25–42hours 27° C.
Similar to a conventional soya sauce process, the koji was mixed at 18th and 25th hours to ensure sufficient airflow through the culture bed for good ventilation.

55 kg of the fermented wheat gluten koji was mixed with 150 kg of water which had previously been sterilized by boiling and then cooled to 4° C. The pH was maintained at 6.0–7.0 by the addition of sodium hydroxide. 0.25 kg of yeast inoculum (freeze dried Debaryomyces hansenii) was added to the fermented wheat gluten koji and the mixture was hydrolyzed at 4° C. with continuous agitation for 10 days in a jacketed enclosed vessel to maintain the desired temperature.

Finally, the hydrolyzed mixture was pressed to separate a wheat gluten sauce from a solid residue. The wheat gluten sauce was treated at 90° C. for 20 minutes. The liquid sauce was concentrated by evaporation. The concentrate obtained was dried in a vacuum oven and then milled into a powder.

For organoleptic evaluation, 10 g of liquid sauce or 3.5 g powder were diluted with 250 ml of boiling water. In both cases the seasoning was found to have more body and a more rounded flavor than a conventional soya sauce.

The powder was found to be shelf stable at 30° C. for more than 12 months in moisture tight packaging (alu-laminated sachets) and had excellent color stability. The seasoning was found to be microbiologically stable.

Example 2

A similar procedure to that described in Example 1 was followed except that the pH of the mixture of the fermented wheat gluten koji, water and yeast was adjusted to. 4.5 using acetic acid and then pre-hydrolyzed at 30° for 24 hours. Following this the pH was adjusted to 6.5 and the mixture was further hydrolyzed for 2 weeks at 4° C.

The seasoning was found to have more body and a more rounded flavor profile than a conventional soya sauce. The seasoning was microbiologically stable as in Example 1 and had excellent color stability in powder form.

Example 3

A similar procedure to that described in Example 2 was followed except that the yeast was absent in the pre-hydrolysis step and was inoculated during the hydrolysis at 4° C.

The seasoning was found to have more body and a more rounded flavor profile than a conventional soya sauce. The seasoning was microbiologically stable as in Example 1 and had excellent color stability in powder form.

Example 4

A similar procedure to that described in Examples 1, 2 or 3 was followed except that salt was added after the pressing stage. The final product contained 50% by weight of salt based on the weight of dry matter. The seasoning was microbiologically stable and had excellent color stability in powder form.

What is claimed is:

1. A process of treating a fermented protein koji prepared from a protein containing material and a carbohydrate, for the production of a seasoning, which comprises hydrolyzing a mixture of the fermented protein koji together with a yeast at a temperature of from about 2° to 25° C. and a pH of from about 4.5 to 10 for a period of from about 6 hours to 28 days, the process eliminating the traditional moromi stage.

2. A process according to claim 1 wherein the hydrolysis of the mixture of fermented koji and yeast is carried out in the absence of salt.

3. A process according to claim 1 wherein the hydrolysis of the mixture of fermented koji and yeast is carried out using from about 1 to 5 parts by weight of water per part by weight of fermented koji.

4. A process according to claim 1 wherein the hydrolysis of the mixture of fermented koji and yeast is carried out at a pH of from about 6 to 7.5.

5. A process according to claim 1, wherein the amount of yeast present is from about 0.05 to 1% by weight based on the weight of the hydrolysate.

6. A process according to claim 1 wherein the hydrolyzing step is preceded by a preliminary hydrolysis step at a temperature between about 25° C. and 50° C.

7. A process according to claim 6 wherein the preliminary hydrolysis step is carried out at a pH of about 4.5 to 5.5.

8. A process according to claim 6 wherein yeast is present in the preliminary hydrolysis step.

9. A process according to claim 6 wherein salt is absent in the preliminary hydrolysis step.

10. A process according to claim 1 wherein, after the hydrolyzing step, up to 70% by weight of salt is added to the hydrolyzed product based on the dry matter.

11. A process according to claim 1 wherein, after the hydrolyzing step, the mixture is pressed to separate a liquid sauce from a solid residue.

12. A process according to claim 11 wherein the liquid sauce is heat treated and then filtered to give a liquid seasoning.

13. A process according to claim 11 wherein the liquid sauce is made into a powder by concentration, then dried reduce the moisture content and finally milled into a powder to provide solid seasoning.

14. A process of treating a fermented protein koji prepared from a protein containing material and a carbohydrate, for the production of a seasoning, which comprises hydrolyzing a mixture of the fermented protein koji together with a live yeast at a temperature of from about 2° to 25° C. and a pH of from about 4.5 to 10 for a period of from about 6 hours to 28 days, the process elimirating the traditonal moromi stage.

15. A process according to claim 14, wherein the hydrolysis of the mixture of fermented koji and yeast is carried out in the absence of salt.

16. A process according to claim 14, wherein the mixture of fermented koji and yeast is carried out using from 1 to 5 parts by weight of water per part by weight of fermented koji.

17. A process according to claim 14, wherein the hydrolysis of the mixture of fermented koji and yeast is carried out at a pH of from 6.0 to 7.5.

18. A process according to claim 14, wherein after the hydrolysis up to 70% by weight of salt is added to the hydrolyzed product based on the dry matter.

19. A process according to claim 14, wherein after the hydrolysis the mixture is pressed to separate a liquid sauce from a solid residue.

20. A process according to claim 19, wherein the liquid sauce is heat treated and then filtered to give a liquid seasoning.

* * * * *

UNITED STATES PATENT AND TRADEMARK OFFICE
CERTIFICATE OF CORRECTION

PATENT NO. : 5,888,561

DATED : March 30, 1999

INVENTORS : P. Neiderberger et al.

It is certified that error appears in the above-identified patent and that said Letters Patent is hereby corrected as shown below:

On the first page, In the Abstract, line 5, change 20° to read 2°.

Signed and Sealed this

Twenty-fourth Day of August, 1999

Attest:

Q. TODD DICKINSON

*Attesting Officer*  *Acting Commissioner of Patents and Trademarks*